United States Patent [19]
Sturgeoff et al.

[11] Patent Number: 5,324,499
[45] Date of Patent: Jun. 28, 1994

[54] FLUORIDE REMOVAL FROM SULPHURIC ACID

[75] Inventors: Lynda G. Sturgeoff, Oakville; Graeme W. Norval, Mississauga; Frederick S. Przystal, Oakville; Andrew E. Yethon, Burlington, all of Canada

[73] Assignee: Chemetics International Co. Ltd.

[21] Appl. No.: 116,734

[22] Filed: Sep. 7, 1993

Related U.S. Application Data

[63] Continuation of Ser. No. 798,756, Nov. 29, 1991, abandoned.

[30] Foreign Application Priority Data

Nov. 30, 1990 [CA] Canada .................. 2031229

[51] Int. Cl.⁵ .................................................. C01B 17/90
[52] U.S. Cl. .................................................. 423/531
[58] Field of Search .................................................. 423/531

[56] References Cited

U.S. PATENT DOCUMENTS

| | | | |
|---|---|---|---|
| 1,891,294 | 12/1932 | Girswald | 423/531 |
| 2,098,056 | 11/1937 | McBerty | 423/531 |
| 3,145,080 | 8/1964 | Juckers et al. | 423/531 |
| 3,294,650 | 12/1966 | Manteufel | 423/531 |
| 3,677,701 | 7/1972 | Hollingswowrth et al. | 423/531 |
| 3,830,904 | 8/1974 | Chiasson et al. | 423/531 |
| 3,976,759 | 8/1976 | Bennett et al. | 423/531 |
| 4,082,832 | 4/1988 | Watanabe et al. | 423/531 |
| 4,138,231 | 2/1979 | Hedenas et al. | 423/531 |
| 4,781,909 | 1/1988 | Evans et al. | |

FOREIGN PATENT DOCUMENTS

| | | | |
|---|---|---|---|
| 1159399 | 12/1963 | Fed. Rep. of Germany | 423/531 |
| 3418241 | 10/1985 | Fed. Rep. of Germany | 423/531 |
| 352830 | 10/1972 | U.S.S.R. | 423/531 |
| 800128 | 1/1981 | U.S.S.R. | 423/531 |

*Primary Examiner*—Gary P. Straub
*Attorney, Agent, or Firm*—Cushman, Darby & Cushman

[57] ABSTRACT

A process for the reduction in fluoride concentration in a fluoride-contaminated sulphuric acid which process comprises treating said sulphuric acid with a silicon compound to produce silicon tetrafluoride, and removing said silicon tetrafluoride to produce a purer sulphuric acid having a substantially reduced fluoride concentration. The process is of particular use for the removal of fluoride from waste sulphuric acid in the copper smelting industry to meet environmental concerns.

14 Claims, 3 Drawing Sheets

FLUORIDE REMOVAL FROM SULPHURIC ACID

This is a continuation of application Ser. No. 07/798,756, filed on Nov. 29, 1991, which was abandoned.

FIELD OF THE INVENTION

This invention relates to a process for the removal of fluoride from waste sulphuric acid and more particularly from waste sulphuric acid produced in the copper smelting industry.

DESCRIPTION OF THE RELATED ART

The use of fluorspar as a flux in the production of copper is well known in the copper smelting industry. This smelting operation results in the production of a hydrogen fluoride contaminated sulphur dioxide gaseous stream. This stream is cleaned in a water cleaning unit to remove heavy metals such as lead, arsenic, mercury and iron in the form of oxide and sulphide dusts, and halides such as fluoride, chloride and bromide as the free acids. The cleaned gaseous stream is subsequently used to produce a concentrated sulphuric acid stream by conversion of the sulphur dioxide to sulphur trioxide in a manner known within the sulphuric acid manufacturing industry.

The cleaning unit produces from its water wash a dilute sulphuric acid, known as "blowdown" acid, having a concentration of about 3-5% sulphuric acid and contaminated with the aforesaid heavy metal and halide impurities. Traditionally, the blowdown acid has been neutralized and/or sent to accumulation ponds.

Other sources of hydrogen fluoride-contaminated waste sulphuric acids solutions are known. For example, some fluorinated aromatic-contaminated spent sulphuric acids are produced in the preparation of specialty chemicals. Fluoroaromatics can be nitrated to paranitrofluoro aromatics in nitrating acid. Also, perfluoro alkane sulphonic acids are prepared through sulphonation of fluorinated alkanes. The spent sulphuric acid contains HF and the fluorinated organic species. The organic species can be destroyed using oxidative treatment; however, a spent acid with substantial fluoride content is produced.

It is currently impractical to concentrate and market the blowdown acid because of either the presence of the hydrogen fluoride, which causes premature corrosion of the materials of construction of a sulphuric acid manufacturing plant, or the presence of the heavy metal contaminants.

It is known in the phosphate fertilizer industry that fluoride present in phosphate rock can be removed from the phosphoric acid product. Phosphoric acid is generated through digestion of the rock by sulphuric acid, which results in the precipitation of gypsum. Some of the fluoride liberated in the digestion reacts with the silica component of the rock to form $SiF_4$ and $H_2SiF_6$, which remain in the phosphoric acid solution. Through vacuum evaporation of the solution, water, HF and $SiF_4$ are removed, the latter two in a 2:1 molar ratio, giving a fluoride and sulphuric acid free concentrated phosphoric acid. The vapours are absorbed in a $H_2SiF_6$ solution giving concentrated fluorosilicic acid.

However, it was not known whether hydrogen fluoride could be effectively removed from a sulphuric acid contaminated with other halo acids and heavy metal salts, by the addition of a silicon compound.

Surprisingly, we have now found a process whereby fluoride can be substantially removed from such a contaminated waste sulphuric acid.

SUMMARY OF THE INVENTION

The invention in its broadest aspect provides a process for the reduction in fluoride concentration in a fluoride-contaminated sulphuric acid which process comprises treating said sulphuric acid with a silicon compound to produce silicon tetrafluoride, and removing said silicon tetrafluoride to produce a purer sulphuric acid having a substantially reduced fluoride concentration.

The invention has particular value when the concentration of the sulphuric acid is greater than 50%, and more preferably 60% sulphuric acid, and especially when in the range 65-75% sulphuric acid.

The invention preferably provides a process for the reduction in fluoride concentration in a fluoride-contaminated waste sulphuric acid, which process comprises:

vapourizing said waste sulphuric acid to form a gaseous stream comprising sulphur trioxide, hydrogen fluoride and sulphuric acid;

treating said gaseous stream with a first sulphuric-acid to produce a fluoride-contaminated enriched sulphuric acid;

treating said fluoride-contaminated enriched sulphuric acid with a silicon compound to produce silicon tetrafluoride; and removing said silicon tetrafluoride from said enriched sulphuric acid to produce a purer sulphuric acid having a substantially reduced fluoride concentration.

The waste sulphuric acid may be any acid stream which contains fluoride. A suitable waste acid of use in the present invention is blowdown acid which has a sulphuric acid concentration of about 3-5%, particularly after the acid has been preconcentrated. However, the waste acid stream of the present invention may contain higher or lower levels of sulphuric acid, optionally prepared by dilution or concentration of the original blowdown acid.

The waste acid is preferably vapourized by atomization of the liquid acid in a hot air stream of a spray drier, although other vapourization methods, such as direct heating may also be utilized. Preferably, the waste acid is vapourized at a temperature which ensures complete vapourization of the liquid acid stream, but which minimizes the decomposition of sulphur trioxide to sulphur dioxide. Gas exit temperatures in the range 370°–450° are preferred.

The sulphur trioxide and hydrogen fluoride of the gaseous stream may be absorbed in the first sulphuric acid in any suitable sulphuric acid absorption means, such as, for example, an absorption tower, an economizer tower, a stripping tower, or a partial condensation tower, as presently known in the industry. A most preferred sulphur trioxide absorption means is a gas/liquid contact absorption tower of the type known in the sulphuric acid manufacturing industry.

After absorption of the sulphur trioxide in said first sulphuric acid, an acid stream of preferably at least 50%, more preferably 60%, still more preferably between 65-75% and yet more preferably 70% sulphuric acid is obtained as the fluoride contaminated enriched sulphuric acid.

The hydrogen fluoride originally present in the waste acid is, thus, also vapourized with the sulphur trioxide derived from the waste sulphuric acid, and absorbed in the first sulphuric acid. The concentration of fluoride in the enriched sulphuric acid stream is at least 10 ppm, more typically greater than 100 ppm and may be greater than 1000 ppm.

We have surprisingly found that the ease of removal and ultimate level of fluoride achieved is dependent upon the acid strength of the silicon compound containing fluoride-contaminated sulphuric acid. The reason for this unexpected behavior is not understood.

It is possible that both silicon tetrafluoride and hexafluorosilicic acid are present in the sulphuric acid solution. Consequently, there may be a complex mixture of fluorosilicon species present resulting from both the dissociation of hexafluorosilicic acid into silicon tetrafluoride and hydrofluoric acid and the acid dissociation of hexafluorosilicic acid. Fluorosilicic acid, like carbonic and sulphurous acids, does not exist under ordinary conditions in the vapour state. The anhydrous acid cannot be isolated. The fluoro species possible in the vapour phase are silicon tetrafluoride and hydrogen fluoride. The relevant chemical equations describing these dissociations are shown below:

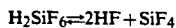
$H_2SiF_6 \rightleftharpoons 2HF + SiF_4$

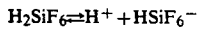
$H_2SiF_6 \rightleftharpoons H^+ + HSiF_6^-$

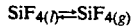
$SiF_{4(l)} \rightleftharpoons SiF_{4(g)}$

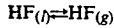
$HF_{(l)} \rightleftharpoons HF_{(g)}$

Additionally, it is well known that there is a complex chemistry of aqueous sulphuric acid entities involving numerous hydrates at different acid strengths. Hexafluorosilicic acid is also known to form at least three hydrates.

The interaction of the various fluorosilicon and sulphuric species in solution cannot be predicted.

The silicon compound is added to the enriched sulphuric acid stream in a suitable reaction vessel. The silicon compound can be any material which will provide silica in the reaction vessel. Suitable materials include, for example, quartz, clays, silica or sand, and in particular, glassmaker's sand. The rate of reaction of the silicon compound with the hydrogen fluoride to form silicon tetrafluoride is dependent on the form of the silicon material used. A highly preferred form of silicon material is fumed silica.

The level of silicon material added to the reaction vessel is preferably in excess of the amount needed for complete reaction of the fluoride to form silicon tetrafluoride. The excess silica level can be maintained in the reaction vessel wherein it is available for reaction with the incoming fluoride containing enriched sulphuric acid stream.

Accordingly, the invention also provides a process according to the invention as described hereinabove wherein said silicon compound is added to said fluoride-contaminated, enriched sulphuric acid stream in an excess amount.

The rate of reaction between the silicon material and the fluoride is also dependent on the reaction temperature. Although the reaction will generally proceed at temperatures as low as 20° C., the reaction may be preferably conducted at temperatures between 100° C. and the boiling point of the enriched sulphuric acid, but preferable at temperatures between 100°–140° C.

The silicon tetrafluoride formed may be removed from the enriched sulphuric acid as a gaseous stream by a number of known methods, such as, vacuum extraction or distillation, for example. However, a preferred method of extraction is by air or steam stripping of the silicon tetrafluoride. Air or steam stripping can be accomplished in any suitable reaction vessel and may be achieved in the gas/liquid contact tower of the type used to absorb the hydrogen fluoride and sulphur trioxide into the first sulphuric acid. Surprisingly, it has been found that in the process of the present invention, air stripping is greatly facilitated when the sulphuric acid concentration of the enhanced sulphuric acid stream is greater than 50%, preferably greater than 60%, yet preferably greater than 65%, and even more preferably about 70%.

In a preferred aspect, the invention provides a process as hereinbefore defined wherein said phosphoric acid-free fluoride-contaminated waste sulphuric acid is blowdown sulphuric acid of a copper smelter manufacturing plant.

Accordingly, the invention provides a process for the reduction in fluoride concentration in a waste sulphuric acid contaminated with hydrohalic acids comprising hydrofluoric acid and heavy metal compounds, which process comprises:

vapourizing said waste sulphuric acid to form a gaseous stream comprising sulphur trioxide, sulphuric acid and hydrogen fluoride and solid particulate matter comprising heavy metal compounds;

separating said gaseous stream from said particulate matter;

treating said gaseous stream with a first sulphuric acid to produce a fluoride-contaminated enriched sulphuric acid;

treating said fluoride-contaminated enriched sulphuric acid with a silicon compound to produce silicon tetrafluoride;

and removing said silicon tetrafluoride from said enriched sulphuric acid to produce a purer sulphuric acid having a substantially reduced fluoride concentration.

In addition to hydrogen fluoride there may be present other hydrohalic acids such as hydrochloric acid and/or hydrobromic acid.

The heavy metal compounds may be present as metallic oxide or sulphide dust suspended in the waste sulphuric acid or as salts dissolved in the waste dilute sulphuric acid. During the vapourization step the metal compounds may be reduced to the metal oxide stage in the form of solid, particulate matter.

The first two process steps of the above defined process in its simplest form may be used to separate solid materials from the waste sulphuric acid, and/or concentrate said sulphuric acid.

As hereinbefore described, spray drying is the preferable method of vapourization of the waste acid.

During the treatment of the gaseous stream with the first sulphuric acid, as described hereinbefore, in any absorption tower, any hydrochloric and hydrobromic acids, in addition to water vapour, exit the tower as a gaseous stream. Thus, the process as hereinbefore defined provides a ready means of removing chloride and bromide from the blowdown acid.

Arsenic may also be present in the waste sulphuric acid carried over from the smelting process, and may collect in the enriched sulphuric acid stream at concentrations of greater than 10 ppm.

Accordingly, in a further feature the invention provides an additional step of removal of the arsenic from the fluoride-free, enriched sulphuric acid stream by reacting the arsenic in said fluoride-free sulphuric acid stream with hydrogen sulphide, or preferably, an alkali thiosulphate and separation of the resultant precipitated arsenic sulphide from the sulphuric acid. Preferably, the alkali thiosulphate is sodium thiosulphate.

Preferably, the silicon tetrafluoride is removed from the enriched sulphuric acid by air stripping and fed to a lime scrubber and converted to calcium fluoride and silica for use as a flux in the smelter.

EXAMPLE 1

The following small scale experiments were conducted on a sample of simulated sulphuric acid stock solution containing the major impurities found in blowdown acid, namely:

| Compound | % w/w | added as |
|---|---|---|
| HCl | 0.5 | HCl |
| $Fe^{2+}$ | 0.04 | $FeSO_4$ |
| $Zn^{2+}$ | 0.09 | $ZnSO_4$ |
| $Bi^{3+}$ | 0.9 | $Bi_2O_3$ |
| $As^{3+}$ | 0.2 | $As_2O_3$ |

Hydrogen fluoride was added to the above stock solution to provide initial fluoride content as stated in TABLE 1, for experiments Nos. 1-3.

Silicon compound as fumed silica was added in a sufficient amount to give the ratio as stated in TABLE 1 to the acid at room temperature and heated to 100°-110° C. in a one liter Teflon ® beaker. The beaker had an inlet for an air sparge and an outlet for the reaction gases, namely silicon tetrafluoride and hydrogen fluoride. These reaction gases were trapped in water or an aqueous HF solution in a polyethylene bottle. The air sparge entered the beaker through an inverted Teflon ® filter apparatus with openings about 1 mm in diameter. Initial and final acid strength and initial and final fluoride content were measured. The results are shown in Table 1.

TABLE 1

| Expt. No. | Initial Acid Strength | Initial Fluoride | Final Fluoride | Si:F Ratio | Sparge Time |
|---|---|---|---|---|---|
| 1. | 57.0% | 1.02% | 0.56% | no silica | 5 hrs |
| 2. | 52.6% | 1.1% | 0.11% | 1:5 | 4 hrs |
| 3. | 52.5% | 1.06% | 0.30% | 1:3 | 5 hrs |
| 4.* | 79.0% | 1.67% | 0.26% | no silica | 3 hrs |
| 5.* | 73.2% | 0.32% | 12 ppm | 1:3.4 | 3 hrs |

*Contained only hydrofluoric acid and sulphuric acid.

These results show that addition of silica to the fluoride-containing sulphuric acid substantially increases the amount of fluoride that can be removed by air sparging. Furthermore, at the higher sulphuric acid strength, it is possible to decrease the fluoride content to a very much lower level than that achievable in 53% sulphuric acid.

EXAMPLE 2

A column was constructed from heavy walled Teflon ® pipe, and was packed with ¼" Teflon ® spheres. The column was wrapped with heating tapes and insulated; the temperature at the column bottom was held at 120° C., and that at the centre was held at 115° C. Air (preheated to 120° C.) was metered into the bottom of the column. The acid solutions (typically 1 kg was prepared prior to starting the experiment) were pumped from a Teflon ® bottle, to the top of a packed column at 7 g min$^{-1}$, the acid which drained from the column was returned to the bottle. Any $SiF_4$ generated was scrubbed from the gas stream through use of a packed column and circulating 1% HF solution. The air stream passed through a 1N NaOH scrubber prior to being vented.

For the initial four experiments, solutions of 68% sulphuric acid with 2500 ppm F$^-$ were prepared. No silica was added for the first two experiments, while sufficient fumed silica was added to the latter two to give Si:F molar ratio of 1:4. For the final three experiments, a solution of contaminated waste acid from a smelter (blowdown acid which had been preconcentrated to 35% $H_2SO_4$), was mixed with sufficient industrial grade 98% $H_2SO_4$ to give a 50% $H_2SO_4$ stock solution. Silica was added as a sodium silicate solution, and the resulting Si:F molar ratio was more than 1:4. The stripping experiments ran for 6 hours, at which time the solution in the bottle was analyzed. The results are shown in Table 2.

The stock solution was prepared from the preconcentrated smelter blowdown acid having the following impurity levels:

| Compound | Preconcentrated smelter blowdown acid % |
|---|---|
| sulphuric acid | 32.8 |
| fluoride | 0.152 |
| chloride | 0.054 |
| copper | 0.376 |
| iron | 0.172 |
| zinc | 0.0852 |
| bismuth | 0.0147 |
| arsenic | 0.0231 | and adjusted to 50% $H_2SO_4$ strength by the addition of 98% $H_2SO_4$.

TABLE 2

| Exp. No. | $H_2SO_4$ % | Si:F ratio | Air rate mL/min | ppm F$^-$ initial | ppm F$^-$ final | % removal |
|---|---|---|---|---|---|---|
| 1. | 67.6 | No Si | 125 | 2450 | 1830 | 27.4 |
| 2. | 67.5 | No Si | 250 | 2450 | 1540 | 38.9 |
| 3. | 67.0 | 1:4 | 125 | 2450 | 138 | 95.1 |
| 4. | 68.3 | 1:4 | 125 | 2700 | 340 | 89.0 |
| 5. | 50.2 | >1:4 | 250 | 1530 | 1230 | 34.9 |
| 6. | 50.4 | >1:4 | 400 | 1540 | 1000 | 48.6 |
| 7.* | 50.4 | >1:4 | 400 | 1258 | 630 | 58.6 |

*reservoir held at 62° C. rather than 50° C. as in experiments 5 and 6.

The results show that without the addition of the silicon compound there is inefficient removal of fluoride from the sulphuric acid at 68% acid strength.

Further, variation in the air sparge flow rate does not appreciably alter the degree of fluoride removal without silicon being present.

Finally, even with the silica present, the extent of fluoride removal is greater at the greater acid strengths.

BRIEF DESCRIPTION OF THE DRAWINGS

The invention will now be described, by way of example only, with reference to the attached Figures, which

FIG. 1 shows a spray dryer 10 having a hot air inlet nozzle 11, a blowdown acid inlet 12, a particulate solid outlet 13 and a gaseous stream conduit 14 connected to a gas filter 15.

Figure 1:
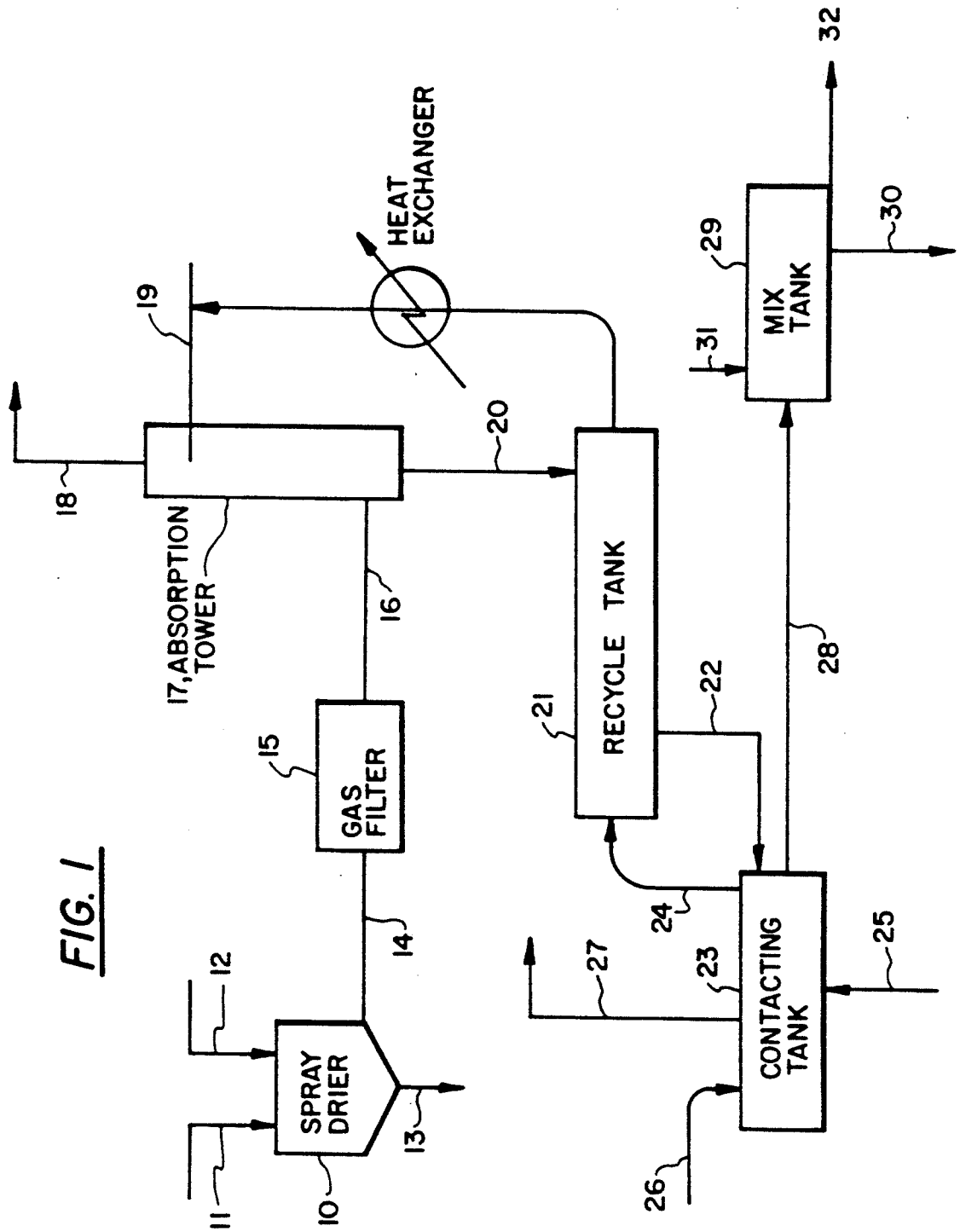
FIGS. 1, 2 and 3 are schematic representations of flow diagrams for apparatus and processes according to the present invention.

Filter 15 has a gaseous stream conduit 16 connected to an absorption tower 17 which is provided with an exit gas vent 18, a first sulphuric acid feed inlet 19 and a fluoride-contaminated enriched sulphuric acid outlet 20. Outlet 20 is connected to a recycle tank 21, which tank has a conduit 22 to a contacting tank 23, and connects with feed inlet 19. Contacting tank 23 has a recycle conduit 24 to recycle tank 21, an air sparge inlet 25, a silica feed inlet 26, and a conduit 27 to a lime scrubber (not shown), and a conduit 28 leading to a mix tank 29. Mix tank 29 is provided with a sludge outlet 30, a thiosulphate addition line 31, and a fluoride-free sulphuric acid product line 32.

In operation, blowdown acid obtained from a copper smelter (not shown) is fed to spray dryer 10 through inlet 12 and vapourized by oil-, or gas-fired hot air entering through inlet nozzle 11 to produce a hot gaseous stream exiting at a temperature of between 370°–400° C. through conduit 14, and a solid particulate matter which is removed through outlet 13.

The gaseous stream is passed through gas filter 15 to remove particulate fines and through conduit 16 to absorption tower 17, wherein the hydrogen fluoride and sulphur values of the gaseous stream are absorbed by means of counter current flows into a first sulphuric acid of approximately 65% sulphuric acid strength and temperatures of 85°–110° C. Water vapour and any sulphur dioxide, hydrogen chloride and hydrogen bromide gases which may be present in the gaseous stream are not appreciably absorbed into the first sulphuric acid and pass out of the tower 17 through vent 18.

The enriched sulphuric acid at a temperature of about 140° C. is passed through outlet 20 to recycle tank 21, which acts as a holding tank from which a portion is recycled as the first sulphuric acid back to tower 17. A further portion of the enriched sulphuric acid of tank 21 is recycled through contacting tank 23 wherein the hydrogen fluoride is reacted with silica added through feed inlet 26 to form silicon tetrafluoride. The silicon tetrafluoride is sparged from the sulphuric acid with air provided through inlet 25 and exits in gaseous form through conduit 27 to a lime scrubber. A portion of the fluoride-free enriched sulphuric acid is fed through conduit 28 to mix tank 29 wherein it is treated with sodium thiosulphate for reaction with any arsenic salts which may be present, to produce arsenic sulphide. The arsenic sulphide is removed through sludge outlet 30 and sulphuric acid product via line 32.

Figure 2:
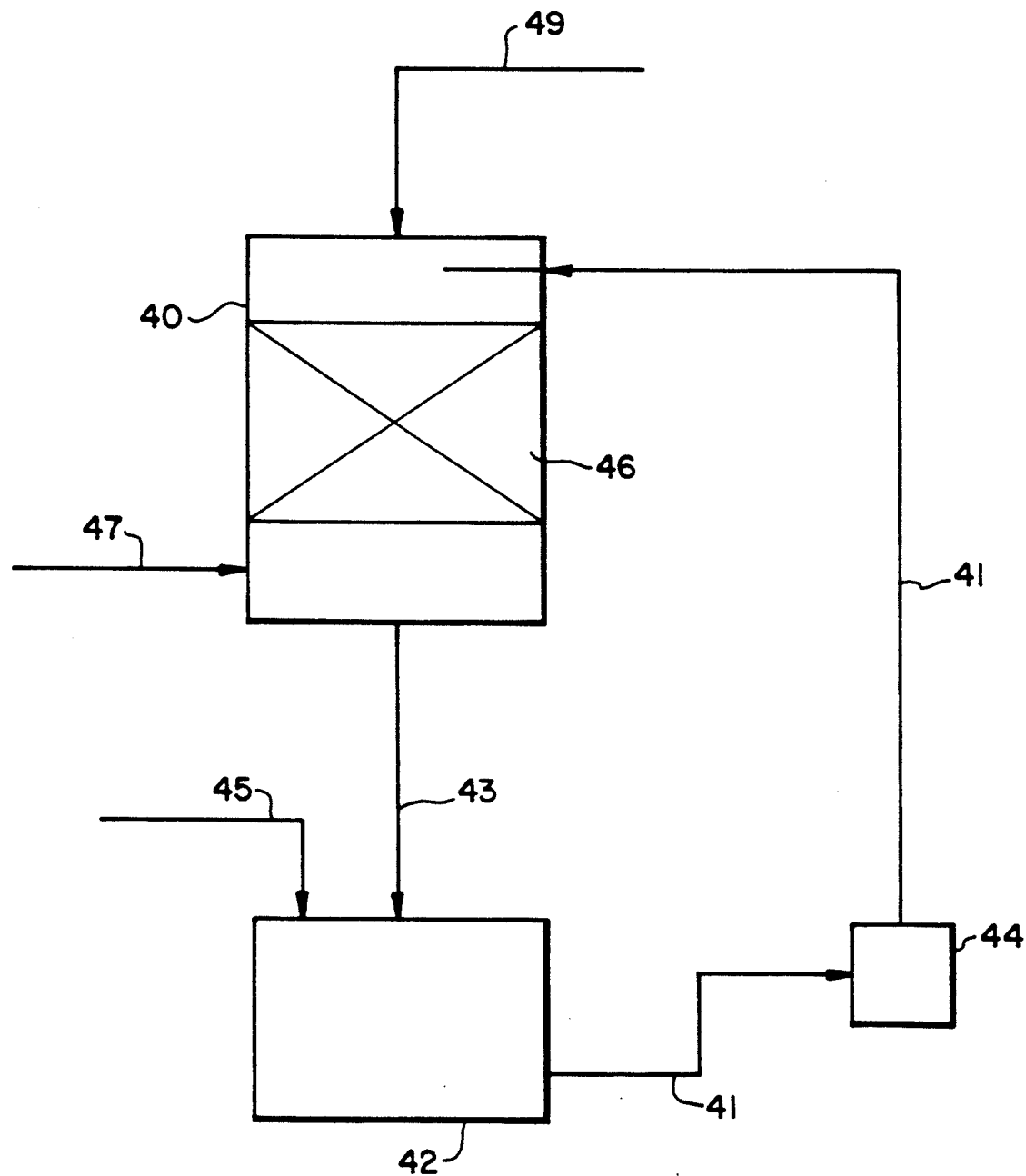

In FIG. 2, an alternative process schematic is shown wherein the silicon tetrafluoride formed is removed from the gas/liquid contact tower, as referred to hereinabove. The apparatus comprises a gas/liquid contact tower 40 connected to a sulphuric acid storage tank 42.

In operation, a sulphuric acid stream is circulated by pump 44 from tank 42 to a gas/liquid contact tower 40. A silica supply pipe 45 adds silica to the sulphuric acid tank 42 and the acid/silica mixture is fed through pipe 41 into the top of tower 40 and passes through a contact zone 46 of the tower. The acid is collected at the bottom of tower 40 and is transferred to tank 42 by pipe 43.

A counter-current flow of a gaseous stream comprising sulphuric acid, sulphur trioxide and hydrogen fluoride is fed to the bottom of tower 40 by gas supply pipe 47. In the contact zone 46 of tower 40, at least a portion of the gaseous sulphur trioxide and sulphuric acid are absorbed into the liquid sulphuric acid to produce an enriched sulphuric acid stream. Also in contact zone 46, the gaseous hydrogen fluoride reacts with the silica in the acid/silica mixture to form gaseous silicon tetrafluoride. Not to be bound by theory, it is expected that the hydrogen fluoride is absorbed in to the acid/silica mixture, where it reacts to form the silicon tetrafluoride. The silicon tetrafluoride is then stripped from the acid/silica mixture by the gases flowing through tower 40. The gaseous silicon tetrafluoride is removed from tower 40 through tower exit pipe 49 where it can be recovered.

The sulphuric acid concentration can vary depending on the location and nature of the gas/liquid contact tower. For example, the strength of the acid exiting an economizer tower may be very low. However, operation of a economical facility would dictate an economizer acid concentration greater than 45 to 50% acid. In a recycle tower, the acid concentration is typically higher than an economizer tower, and typically is in the range of 65 to 75% acid.

In order to ensure the maximum recovery of silicon tetrafluoride, an excess of silica is preferably added to the acid.

Figure 3:
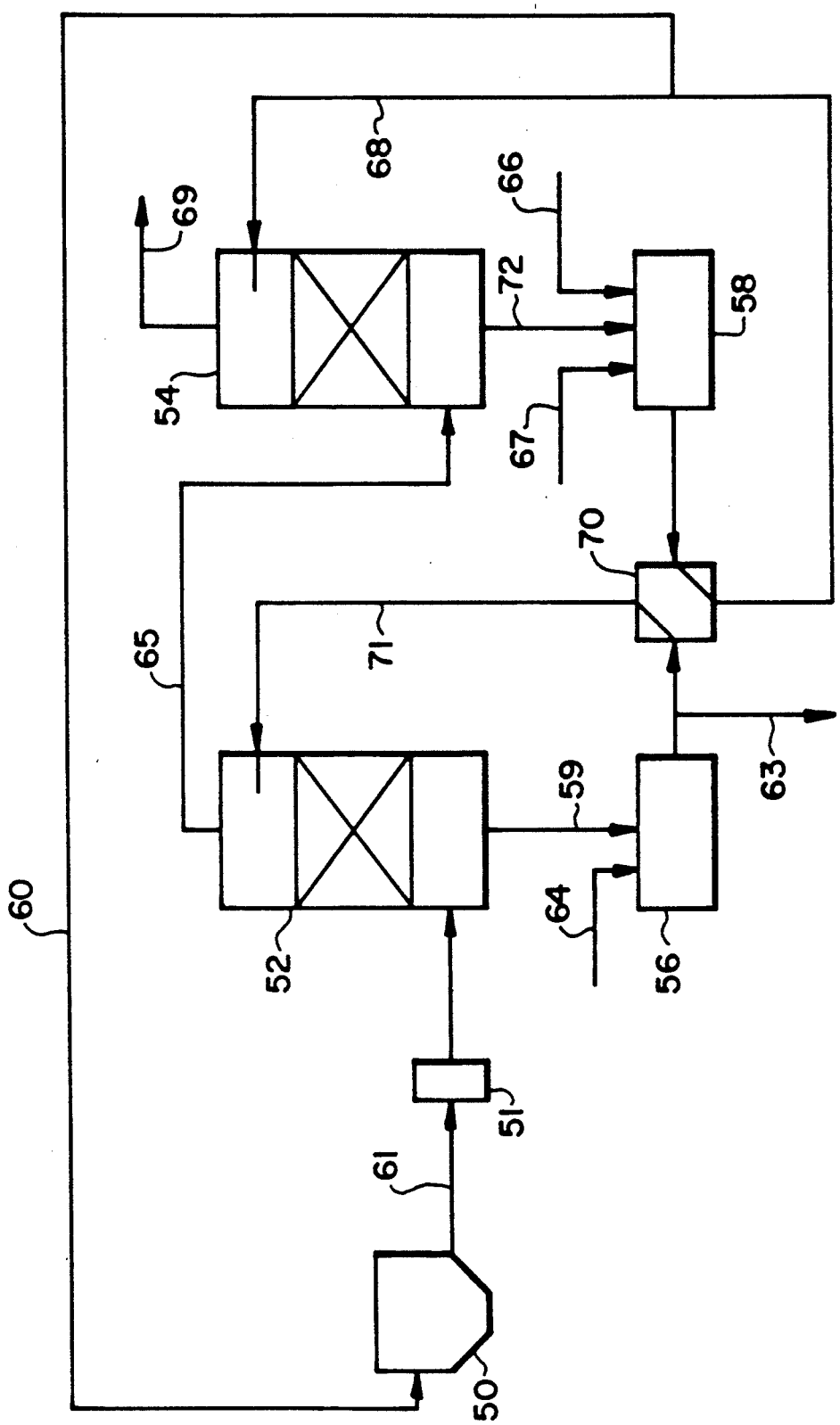

In FIG. 3, an process schematic for a sulphuric acid recovery process is shown comprising a spray drier 50, a recycle tower 52 and an economizer tower 54 wherein gaseous silicon tetrafluoride is recovered from the gas/liquid contact towers.

In operation, a liquid acid stream comprising 50% acid contaminated with fluoride is supplied via pipe 60 to spray drier 50 wherein the liquid acid is vapourized to form a first gaseous stream of sulphuric acid, sulphur trioxide, and hydrogen fluoride. The first gaseous stream is fed to recycle tower 52 via pipe 61 after passing through gas filter 51. Any metal salts or other particulate materials are recovered directly from spray drier 50, or may be removed in gas filter 51.

In recycle tower 52, the first gaseous stream is contacted with acid/silica mixture pumped from tank 56, through pipe 71, in a manner as described in regards to FIG. 2. The enriched acid exiting recycle tower 52, via pipe 59, has a concentration of 70% acid and a portion of this acid stream may be recovered, at a suitable location, such as through pipe 63, as product acid. Silica is added to tank 56 via pipe 64.

Any unabsorbed sulphur trioxide, sulphuric acid and any unreacted hydrogen fluoride, together with the silicon tetrafluoride formed, exits recycle tower 52 as a second gaseous stream. This second gaseous stream is fed via pipe 65 to economizer tower 54, wherein the second gaseous stream is contacted with an acid/silica mixture, pumped from tank 58, again in a manner as described in regards to FIG. 2. An enriched acid stream exits tower 54, via pipe 72, and is stored in tank 58. Silica is added to tank 58 through pipe 66.

A waste acid stream, comprising a liquid fluoride-contaminated sulphuric acid stream, having a concentration of 20% acid, is also fed to tank 58 via pipe 67. In tank 58, the waste acid, the silica and the enriched acid from economizer tower 54 are mixed to produce a fluoride-contaminated acid stream having an acid concentration of 50%. A portion of this acid is circulated through economizer tower 54 via pipe 68. A second portion of this acid is used as the acid which is supplied to spray drier 50 via pipe 60.

In order to recover heat during this process, the hot sulphuric acid circulating through recycle tower 52 is used to heat the acid circulating through economizer tower 54 in heat exchanger 70.

The silicon tetrafluoride formed in economizer tower 54, and the silicon tetrafluoride carried over from recycle tower 52, exit economizer tower through gas exit pipe 69, and may be recovered prior to the discharge of the gas.

The recycle tower, the economizer tower and the spray drier are generally operated in a manner as is known within the art, with the exception of the addition of silica to form silicon tetrafluoride in accordance with the present invention.

Having described specific embodiments of the present invention, it will be understood that modifications thereof may be suggested to those skilled in the art and it is intended to cover all such modifications as fall within the scope of the appended claims.

The embodiments of the invention in which an exclusive property or privilege is claimed are defined as follows:

1. A process for the reduction of fluoride concentration in a waste sulphuric acid, which acid is contaminated with hydrogen fluoride and heavy metal salts, which process comprises:
   a) establishing a first circulating sulphuric acid loop at a temperature between about 20° C. and the boiling temperature of said first circulating sulphuric acid;
   b) adding said waste sulphuric acid to said first circulating sulphuric acid;
   c) adding silica to said first circulating sulphuric acid circulation loop to convert at least a portion of said hydrogen fluoride to silicon tetrafluoride;
   d) removing a portion of said first circulating sulphuric acid and spray drying said portion to produce a gaseous stream comprising hydrogen fluoride, sulphur trioxide, sulphuric acid, silica, silicon tetrafluoride and heavy metal salts, at a temperature sufficient to ensure complete drying of said portion and which minimizes decomposition of sulphur trioxide to sulphur dioxide;
   e) separating the solid components from the gaseous stream;
   f) contacting said gaseous stream with a second circulating sulphuric acid loop to absorb at least a portion of said sulphur trioxide into said second circulating sulphuric acid to generate additional sulphuric acid in said second circulating acid and produce a second gaseous stream containing at least one of unabsorbed sulphur trioxide, sulphuric acid, unreacted hydrogen fluoride and silicon tetrafluoride, said second circulating sulphuric acid being at a temperature between about 20° C. and the boiling temperature of said second circulating sulphuric acid, and said second circulating acid containing said additional sulphuric acid having an acid concentration of at least about 50%;
   g) adding silica to said second circulating sulphuric acid to convert at least a portion of said hydrogen fluoride to silicon tetrafluoride;
   h) removing a portion of said second circulating sulphuric acid as product;
   i) contacting said second gaseous stream with said first circulating sulphuric acid to absorb said unabsorbed sulphur trioxide into said first circulating sulphuric acid to generate second additional sulphuric acid in said first circulating acid and react at least a portion of said unreacted hydrogen fluoride with said silica in said first circulating sulphuric acid to produce silicon tetrafluoride, and said first circulating acid containing said second additional sulphuric acid having an acid concentration of at least about 45%;
   j) removing said silicon tetrafluoride.

2. The process according to claim 1, wherein steps f) and i) are each conducted in separate sulphuric acid absorption towers.

3. The process according to claim 2, wherein said sulphuric acid absorption tower is a gas/liquid contact absorption tower.

4. The process according to claim 1, wherein during step f) the acid concentration of said second circulating sulphuric acid is about 65–75%.

5. The process according to claim 1, wherein said temperature of said first circulating sulphuric acid is between about 100° C. and the boiling temperature of said first circulating sulphuric acid and said temperature of said second circulating sulphuric acids is between about 100° C. and the boiling temperature of said second circulating sulphuric acid.

6. The process according to claim 1, wherein said temperature of said first and second circulating sulphuric acids is between about 100°–140° C.

7. The process according to claim 1, wherein the acid concentration of said second circulating sulphuric acid is greater than said first circulating sulphuric acid.

8. A process for the reduction of fluoride concentration in a waste sulphuric acid, which acid is contaminated with fluoride and heavy metal salts, which process comprises:
   a) establishing a circulating sulphuric acid loop at a temperature between about 20° C. and a boiling temperature of said circulating sulphuric acid;
   b) vaporizing said waste sulphuric acid to produce a gaseous stream comprising hydrogen fluoride, sulphur trioxide and sulphuric acid, and heavy metal particulates, at a temperature sufficient to ensure complete vaporization of said waste sulphuric acid and which minimizes decomposition of sulphur trioxide to sulphur dioxide;
   c) removing said particulates;
   d) contacting said gaseous stream with said circulating sulphuric acid to absorb said sulphur trioxide into said circulating sulphuric acid to generate additional sulphuric acid in said sulphuric acid loop, and said circulating sulphuric acid containing said additional sulphuric acid having an acid concentration of at least about 45%;
   e) adding silica to said circulating sulphuric acid to convert at least a portion of said hydrogen fluoride to silicon tetrafluoride;
   f) removing said silicon tetrafluoride from said circulating sulphuric acid; and
   g) removing a portion of said circulating sulphuric acid as product.

9. A process as claimed in claim 8, wherein said circulating sulphuric acid has a sulphuric acid concentration greater than 60%.

10. A process as claimed in claim 8, wherein said circulating sulphuric acid has a sulphuric acid concentration between 65–75% sulphuric acid.

11. A process as claimed in claim 8, wherein said circulating sulphuric acid has a sulphuric acid concentration of about 70% sulphuric acid.

12. A process as claimed in claim 8, wherein said silica is fumed silica.

13. A process as claimed in claim 8, wherein said gaseous stream is contacted with said circulating sulphuric acid in a sulphuric acid absorption tower.

14. A process as claimed in claim 8, wherein said waste sulphuric acid contains greater than 1000 ppm hydrogen fluoride.

* * * * *